(12) United States Patent
Maskell et al.

(10) Patent No.: US 7,762,633 B2
(45) Date of Patent: Jul. 27, 2010

(54) BRAKE CONTROL SYSTEM

(75) Inventors: Andrew Maskell, Warwickshire (GB); Simon Owen, Brockhill (GB); Karl Richards, Royal Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 11/551,442

(22) Filed: Oct. 20, 2006

(65) Prior Publication Data
US 2007/0090691 A1 Apr. 26, 2007

(30) Foreign Application Priority Data
Oct. 21, 2005 (GB) ................... 0521368.1

(51) Int. Cl.
B60T 8/32 (2006.01)
B60T 8/24 (2006.01)
(52) U.S. Cl. ........................ 303/192; 701/94
(58) Field of Classification Search ............... 303/191, 303/192; 701/94
See application file for complete search history.

(56) References Cited

U.S. PATENT DOCUMENTS

| 4,629,043 | A | | 12/1986 | Matsuo et al. | |
|---|---|---|---|---|---|
| 4,717,207 | A | * | 1/1988 | Kubota et al. | 303/3 |
| 5,941,614 | A | * | 8/1999 | Gallery et al. | 303/192 |
| 5,984,435 | A | * | 11/1999 | Tsukamoto et al. | 303/191 |
| 5,997,108 | A | * | 12/1999 | Claussen et al. | 303/192 |
| 6,193,333 | B1 | * | 2/2001 | Guest | 303/192 |
| 6,260,934 | B1 | * | 7/2001 | Lee | 303/192 |
| 7,034,476 | B2 | * | 4/2006 | Wang et al. | 318/139 |
| 7,399,040 | B2 | * | 7/2008 | Schmidt | 303/192 |

FOREIGN PATENT DOCUMENTS

| DE | 10154633 | | 5/2003 |
|---|---|---|---|
| EP | 0784551 B1 | | 7/1997 |
| EP | 0784551 | | 3/1999 |
| GB | 2348682 | | 10/2000 |
| JP | 59158350 A | * | 9/1984 |
| WO | WO 01/14186 | | 3/2001 |
| WO | WO 2004/039646 | | 5/2004 |
| WO | WO 2005/090134 | | 9/2005 |

* cited by examiner

Primary Examiner—Thomas J Williams
(74) Attorney, Agent, or Firm—Brooks Kushman P.C.

(57) ABSTRACT

A motor vehicle has an inclinometer to determine the steepness of the slope upon which the vehicle stands, brakes and a driver brake pedal for generating a braking effort in the brakes. The brakes are also controlled by a brake hydraulic control unit and an electronic control unit. The brake hydraulic control unit is arranged to control the release of the braking effort generated to stop the vehicle on a slope by the brake pedal at a release rate which varies as a function of the steepness of the slope determined by the inclinometer following operation of the brake pedal to release the brakes. The vehicle thus achieves controlled descent of a hill after a stationary position. Such a brake control system is particularly advantageous to a motor vehicle having a hill descent mode.

21 Claims, 4 Drawing Sheets

BRAKE CONTROL SYSTEM

TECHNICAL FIELD

The present invention relates to a brake control system for a motor vehicle particularly but not exclusively comprising a hill descent mode which can be activated or de-activated by a driver interface in order to achieve controlled descent of a hill without the need for the driver to press a brake pedal.

BACKGROUND

The patent EP 0 784 551 B1 discloses a brake control system in particular for vehicles used in off-road conditions. The brake control system comprises an electronic control unit and a brake control system to control brakes associated with each wheel of the vehicle. A driver interface in the form of a switch is used to cause the control unit to enter a hill descent mode when the vehicle is also detected to be in gear. In this mode, the control unit controls the speed of the vehicle by braking to slow the vehicle when a detected vehicle speed is above a preset target speed.

When driving off road with the hill descent mode active, it might be necessary to stop on a downhill slope, and then move off again. When moving away again from standstill, the brake pedal is released and the vehicle accelerates under the force of gravity until it reaches a preset target speed. When this target speed is approached, the control unit applies the brakes to maintain the target speed. On a steep slope, the rate of acceleration can be quite high requiring a large braking effort to prevent the speed of the vehicle from continuing past the target value, resulting in an aggressive and intrusive deceleration. If the vehicle is in wet or muddy conditions, i.e. where the traction is poor, this aggressive intervention can cause the electronic control to perform an anti-lock braking function which will over-ride the hill descent control function to prevent the wheels from locking. Hence the vehicle may accelerate above the target speed and lose stability. The same problem can occur with a vehicle without hill descent mode, but with an anti-locking device, when the driver wants to reduce the speed of the vehicle after moving off from a standstill position on a downhill slope. It is desired to provide an improved brake control system which overcomes or minimizes the above problems.

SUMMARY OF THE INVENTION

According to a first aspect of the invention there is provided a brake control system for a motor vehicle, the vehicle having a plurality of wheels, a plurality of brakes, each brake being associated with a respective wheel and a gradient sensing means to determine the slope of the ground upon which the vehicle stands. The brake control system comprises a driver operated brake command input, a brake actuation means for actuating the brakes, and a brake control means for controlling the brake actuation means in accordance with the operation of the brake command input and vehicle parameters. The brake control means is arranged to detect that the vehicle is stationary and is held on a slope by a braking effort supplied by the brakes in accordance with the operation of the brake command input. It also controls the release of the braking effort as a function of the steepness of the slope following operation of the brake command input to release the brakes.

Preferably, the brake control means is arranged to retain the braking effort for a period of time which varies as a function of the steepness of the slope as determined from the gradient sensing means. The brake control means may also be arranged to release the braking effort at a release rate which varies as a function of the steepness of the slope as determined from the gradient sensing means. The release rate is preferably determined so as to be inversely proportional to the steepness of the slope.

The system may further comprise a driver accelerator pedal and an accelerator pedal position sensor in which, if a signal from the accelerator pedal is monitored by the brake control means during the release of the braking effort, then the braking effort is immediately released.

Preferably, the gradient sensing means is an inclinometer, the driver operated brake command input is a driver brake pedal, and the brake actuation means is a hydraulic control unit.

The system may further comprise a driver interface which can activate a hill descent mode in which a predetermined vehicle speed is set by automatically applying each brakes through the brake actuation means, in which the brake control means control the release of the braking effort when the vehicle is detected stationary on a slope under operation of the brake command input only during activation of the hill descent mode.

The invention also provides, according to another aspect, a method of controlling a braking effort within a brake control system which is in accordance with said first aspect when the vehicle is determined to be in a stationary state on a slope under a braking effort. If the brake control means monitors that the driver operated brake command is released, then the brake actuation means is commanded to release the braking effort supplied by the brakes as a function of the steepness of the slope as determined by the gradient sensing means.

When the system includes a hill descent mode, the method preferably includes the step of controlling the release braking effort by the brake actuation means only if the hill descent control mode is activated.

The invention also provides, according to another aspect, a method of controlling a braking effort within a brake control system of a vehicle having a gradient sensing means which is in accordance with said first aspect, the method comprising the steps of: determining whether the vehicle is held on a slope by a braking effort; determining whether the signal from the gradient sensing means indicates that the slope is steeper than a predetermined value, determining whether the driver operated brake command input is released, and releasing the braking effort supplied by the brakes at a predetermined rate when the previous steps are confirmed.

Preferably, when the system further comprises a driver interface which can activate a hill descent mode in which a predetermined vehicle speed is set by automatically applying each brakes through the brake actuation means, the method comprises the further step of determining whether the hill descent control mode is activated.

BRIEF DESCRIPTION OF THE DRAWINGS

The invention will now be described by way of example with reference to the accompanying drawings of which.

DESCRIPTION OF THE PREFERRED EMBODIMENTS

Figure 1:
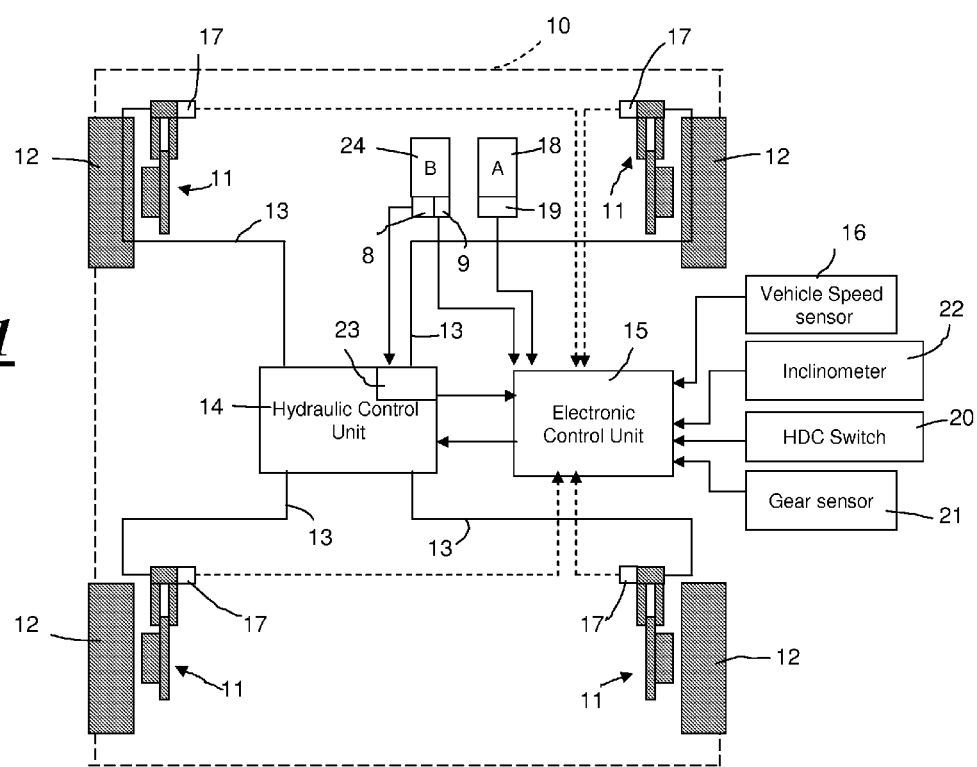
FIG. 1 is a schematic drawing of a brake control system for a motor vehicle in accordance with the present invention.

Referring to FIG. 1, there is shown a motor vehicle 10 in a dashed outline with a brake control system having a hill descent mode.

The brake control system includes in a conventional manner a braking arrangement with a disc brake 11 on each of four wheels 12. Each disc brake 11 is hydraulically operated through a hydraulic line 13 by a brake hydraulic control (HC) unit 14. The HC unit 14 is controlled by an electronic control (EC) unit 15. FIG. 1 is only a diagram of the most important functional components of the brake control system in accordance with the invention. Further details of the brake control system are described in EP 0 784 551 B1 and are included in the description by reference and thus will not be further described.

The EC unit 15 receives a vehicle speed signal from a vehicle speed sensor 16, an individual wheel speed signal from a wheel speed sensor 17 on each wheel 12 and a driver demand signal from an accelerator pedal 18 which incorporates an accelerator pedal position sensor 19. The EC unit 15 also receives a hill descent signal from a driver hill control switch 20, a gear signal from a gear sensor 21 and an inclination angle signal from a gradient sensing means, in this example an inclinometer 22. The EC unit 15 receives a pedal braking signal from a brake light switch 9 on a brake pedal 24.

The brake pedal 24 is also associated with a master cylinder 8 which is connected to a brake pressure sensor 23 forming part of the HC unit 14. The brake pressure sensor 23 is arranged to send a driver braking signal from the brake pressure sensor 23 to the EC unit 15.

The EC unit 15 is active to control the HC unit 14 when the hill control switch 20 is switched on by the driver to select hill descent mode, the driver's foot is off the brake pedal 24 and the gear sensor 21 detects that the engine is in gear, for instance low gear, first gear or reverse gear. As a result the braking effort applied by the disc brakes 11 can maintain the vehicle at or below a preset speed when descending a hill.

Thus from a standstill position on a slope, the EC unit 15 will allow the release of the disc brakes 11 and allow the vehicle to accelerate under the force of gravity up to the preset speed, for example about 10 kph. It will be appreciated in particular that when the vehicle is on a very steep ground the rate of acceleration can be quite high, requiring a large braking effort to prevent the vehicle from continuing to accelerate past the preset speed. This can result in an aggressive and intrusive deceleration which can cause the EC unit 15 to perform an anti-lock braking function which will over-ride the hill descent function to prevent the wheels 12 from locking. Hence a loss in stability can occur with also a loss of driver comfort and in some case driver confidence in the brake control system. To overcome this problem, the HC unit 14 is arranged to control release of the braking effort at the wheels in accordance with the measured gradient of the vehicle after releasing the brake pedal 24 subsequent to a stop of the vehicle on a slope when the hill descent control mode is activated.

Figure 2:
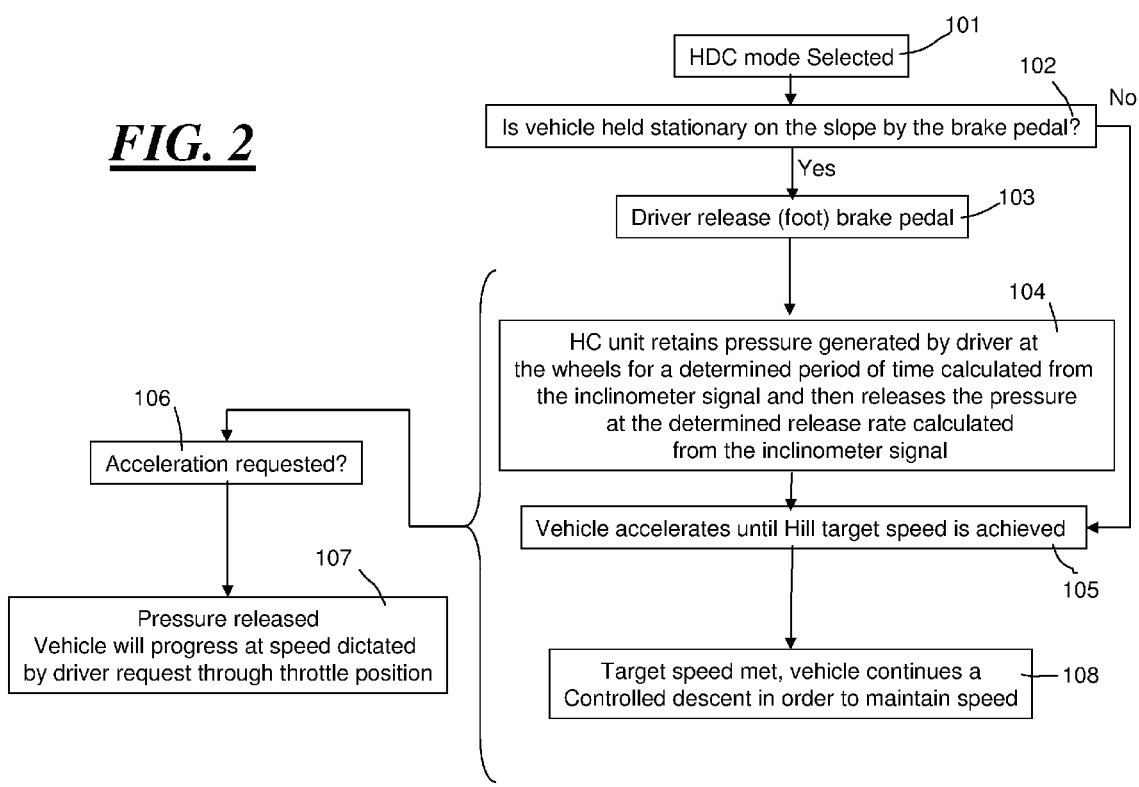
FIG. 2 is a flow chart illustrating operation of the brake control system shown in block form in FIG. 1.

Operational modes of the brake control system will be described in further detail with reference to the flow chart of FIG. 2. When the hill descent mode is activated at step 101, the EC unit 15 checks at step 102 whether or not the vehicle is stationary on the slope by obtaining a signal from the brake light switch 9, a signal from the inclinometer 22 which determine the steepness of the slope, a signal from the brake pressure sensor 23 and a signal from the vehicle speed sensor 15. If the answer is "No", the EC unit 15 will control the HC unit 14 in manner described in EP 0 784 551 B1 so that the vehicle can accelerate up to the preset target speed at step 105 where the EC unit 15 will control the HC unit 14 as appropriate to keep the vehicle speed constant. If the answer is "Yes", the release of the brake pedal at step 103 will command the HC unit 14 through the EC unit 15 to retain the braking effort at the wheels 12 over a period of time which is a function of the steepness of the slope as determined from the inclinometer 22. The EC unit 15 then progressively decreases the braking effort by releasing hydraulic pressure at a rate which is a function of the steepness of the slope at step 104 so that the vehicle can accelerate slowly until the preset speed is achieved, at step 105. The brake control system then continues to control the braking effort at the disc brakes 11 in order to maintain the vehicle at the target speed at step 108.

In the event that the EC unit 15 detects a signal from the accelerator pedal 18 at step 106, the EC unit 15 sends a command to the HC unit 14 in order to immediately release the braking effort at the wheels and control the vehicle at speed dictated by the driver request through the throttle position at step 107.

Figure 3:
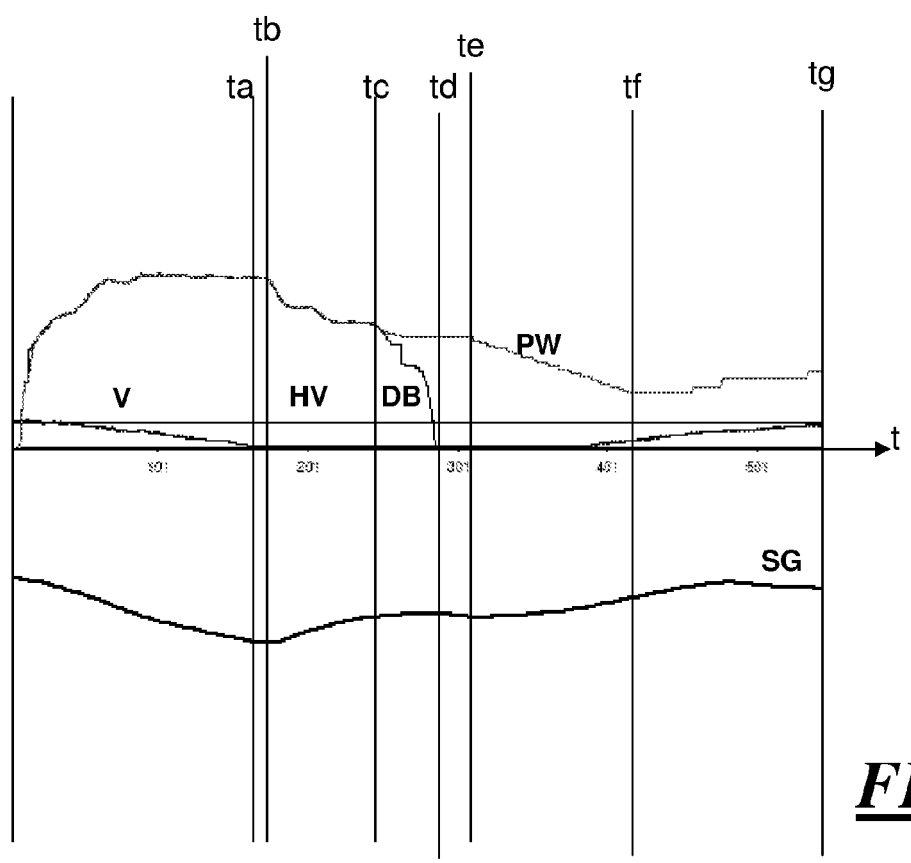
FIG. 3 is a time line of a vehicle equipped with the brake control system shown in FIG. 1 stopping on a downhill slope and restarting under gravity and showing driver braking, together with vehicle speed, braking effort at the wheels, hill descent target speed and the measured slope.

FIG. 3 shows time-line plots which illustrate the operational modes of the braking system. In these plots which show various values plotted against time (t), the line SG shows the measured slope or gradient, the line V shows the vehicle speed, the line HV shows the hill target speed, the line DB shows the driver braking effort as measured by the brake pressure sensor 23 and the line PW shows the hydraulic pressure at the wheels 12 as measured in the hydraulic lines 13.

The graph shows that the vehicle is initially travelling down a slope while the driver is using the brake pedal 24 to stop the vehicle on the slope at time (ta). At time (tb) the driver starts to progressively release his foot from the brake pedal 24 until time (tc) where his foot is off the brake pedal. It will be appreciated that the pressure in the master cylinder is progressively decreasing to a null value as shown at time (td). At time (tc), the EC unit 15 detects from the brake light switch 9 that the brake pedal is returned to its original position and thus that the driver has released his foot. At time (tc), the EC unit 15 also determine that the braking effort needed to stop the vehicle on the slop is the braking effort detected when the brake pedal is monitored at its original position by the brake light switch 9. The EC unit 15 then controls the HC unit 14 so as to retain at the disc brakes 11 the braking effort generated by the driver for a period of time, time (tc) to time (te), which varies as a function of the steepness of the slope as determined from the inclinometer. The EC unit 15 then releases the pressure at the brakes 11 at a release rate which varies as a function of the steepness of the slope as determined from the inclinometer. In this example the brake pressure release rate is determined so as to be inversely proportional to the steepness of the slope. Therefore if the slope is very steep the brake pressure release will be slow while if the slope is relatively gentle the brakes will be released rapidly. At time (tf) the vehicle speed V has risen to a magnitude where the hill descent control function prevents further release of the braking effort and in this particular example, increases the braking effort to allow a controlled acceleration of the vehicle to the target speed at time (tg).

When the driver releases the brake pedal 24 there is a short period of time (tc) to (td) while the hydraulic pressure sent from the master cylinder to the HC unit 14 falls to zero. The time (tc) to (te) during while the braking effort is maintained at the brakes allows for this period. The period (tc) to (td) is longer if the master cylinder initially generates a very high pressure as is required to hold the vehicle on a very steep slope so the time delay (tc) to (te) is also made variable and in proportion to the slope of the hill, i.e. the steeper the hill, the longer the delay.

The delay also period is a variable delay (in a range of milliseconds) which can allow the driver to gain confidence before the vehicle starts accelerating. In this period of time the driver is thus able to resume to an appropriate posture for travelling down the hill. If the slope is very steep this variable delay will be longer than if the slope is relatively gentle.

For this reasons the delay may be fixed, or particularly where the design of brake actuation system provides little or no short period (time (tc) to (td)), may be eliminated.

In an alternative, this variable delay to retain the braking effort is deleted so that when the driver has released his foot from the brake pedal, the EC unit 15 releases the braking effort generated by the brake pedal at the brakes at a release rate which varies as a function of the steepness of the slope as determined from the inclinometer.

Figure 4:
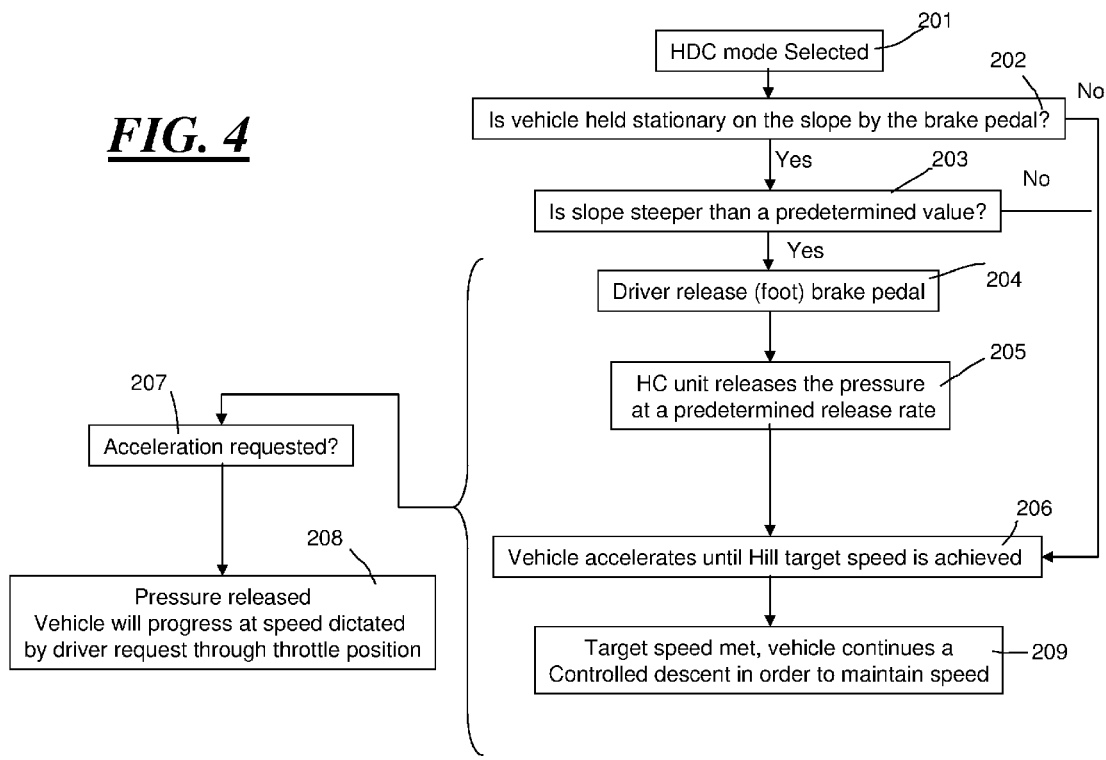
FIG. 4 is a flow chart illustrating an alternative operation of the brake control system shown in block form in FIG. 1.

FIG. 4 illustrates an alternative operational mode of the brake control system. When the hill descent mode is activated at step 201, the EC unit 15 checks at step 202 whether or not the vehicle is stationary on the slope by obtaining a signal from the brake light switch 9, a signal from the inclinometer 22 which determine the steepness of the slope, a signal from the brake pressure sensor 23 and a signal from the vehicle speed sensor 15. If the answer is "Yes", the EC unit 15 checks at step 203 whether or not the slope is steeper than a predetermined value, for instance 20%, by comparing the signal from the inclinometer with the predetermined value. If the answer is "Yes", the release of the brake pedal at step 204 will command the HC unit 14 through the EC unit 15 to progressively decreases the braking effort by releasing hydraulic pressure at a predetermined release rate at step 205 so that the vehicle can accelerate slowly until the preset speed is achieved, at step 206. The brake control system then continues to control the braking effort at the disc brakes 11 in order to maintain the vehicle at the target speed at step 209.

If the answer is "No" at step 202 or/and at step 203, the EC unit 15 will control the HC unit 14 in manner described in EP 0 784 551 B1 so that the vehicle can accelerate up to the preset target speed at step 206 where the EC unit will 15 control the HC unit 14 as appropriate to keep the vehicle speed constant.

In the event that the EC unit 15 detects a signal from the accelerator pedal 18 at step 207, the EC unit 15 sends a command to the HC unit 14 in order to immediately release the braking effort at the wheels and control the vehicle at speed dictated by the driver request through the throttle position at step 208.

The invention therefore provides a brake control system which in a case of the vehicle is detected stationary on a slope under driver braking allows a smooth hand over of the control of the braking effort to the HC unit in a way which provides not only comfort and confidence to the driver but also the safety of the vehicle as it is kept stable on the slope.

Although the invention has been described with a hill descent mode with only the first gear engaged, it would be appreciate it that a similar control of the brake is achieved when the vehicle is travelling down a slope in reverse gear, for instance after a failed hill climb. Furthermore, the invention can also be applied to a vehicle without hill descent mode. In addition, it will be appreciated that the invention can be applied to a vehicle equipped with brake-by-wire. In this case the pressure sensor and the HC unit are respectively replaced for instance by electronic sensor and electric brake actuator.

Also although the invention has been described with a brake pedal, the invention may also be applicable to another driver operated brake command input such as an electric park brake.

What is claim is:

1. A brake control system for a motor vehicle having a plurality of wheels, a plurality of brakes, each brake being associated with a respective wheel, and a gradient sensor to determine the slope of the ground upon which the vehicle stands, the system comprising:
   a driver operated brake command input;
   a brake actuator for actuating at least one of the plurality of brakes; and
   a brake controller for controlling the brake actuator in accordance with the operation of the brake command input and vehicle parameters, the brake controller arranged to detect that the vehicle is held stationary while facing forwardly in a downward direction on a descending slope by a braking effort supplied by the brakes in accordance with the operation of the brake command input; and
   a driver interface for activating a hill descent control mode with a preset vehicle speed, the hill descent control mode preventing the vehicle from traveling the descending slope at a speed greater than the preset vehicle speed;
   wherein upon activation of the hill descent control mode and operation of the brake command input to release the brakes while the vehicle is facing forwardly in the downward direction and held stationary on the descending slope, the brake controller gradually decreases the braking effort over time as a function of the steepness of the descending slope to allow the vehicle to accelerate more slowly than the vehicle would accelerate under gravity until the preset vehicle speed is reached and then controls the brake actuator to automatically apply the brakes as needed to prevent the vehicle from traveling the descending slope at a speed greater than the preset vehicle speed.

2. A system as claimed in claim 1 wherein upon operation of the brake command input to release the brakes, the brake controller is arranged to retain the braking effort for a period of time which varies as a function of the steepness of the slope as determined from the gradient sensor.

3. A system as claimed in claim 1 wherein the brake controller is arranged to gradually decrease the braking effort at a release rate which varies as a function of the steepness of the descending slope as determined from the gradient sensor.

4. A system as claimed in claim 3 wherein the release rate is determined so as to be inversely proportional to the steepness of the descending slope.

5. A system as claimed in claim 1, further comprising a driver accelerator pedal and an accelerator pedal position sensor in which if a signal from the accelerator pedal is monitored by the brake controller during the release of the braking effort, then the gradual decrease in the braking effort is overridden to provide immediate and complete release of the braking effort.

6. A system as claimed in claim 1 wherein the gradient sensor is an inclinometer.

7. A system as claimed in claim 1 wherein the driver operated brake command input is a driver brake pedal.

8. A system as claimed in claim 1 wherein the brake actuator comprises a hydraulic control unit.

9. A system as claimed in claim 1 wherein the brake controller is arranged to determine that a signal from the gradient sensor indicates that the slope is steeper than a predetermined value such that the brake controller releases the braking effort supplied by the brakes at a predetermined rate.

10. The system of claim 1 wherein the gradual decrease of the braking effort is characterized by at least one of the plurality of brakes applying a force against at least one of the wheels in an attempt to restrain wheel rotation, wherein the force is less than a force required to completely prevent wheel rotation yet sufficient to prevent the vehicle from accelerating more quickly than the vehicle would accelerate under gravity.

11. The system of claim 10 wherein the brake controller gradually decreases the force until the force is completely removed before subsequently increasing the force in order to prevent the vehicle from traveling the descending slope at a speed greater than the preset vehicle speed.

12. A system as recited in claim 1 wherein the brake controller initially controls the brake actuator to apply a first amount of braking effort in order to hold the vehicle stationary on the descending slope, and thereafter, controls the brake actuator to gradually decrease the braking effort to at least a second amount, the brake controller controlling a rate at which the braking effort is decreased from the first amount to the second amount as a function of the steepness of the descending slope, the rate being inversely proportional to the steepness of the descending slope.

13. A system as recited in claim 1 wherein the brake controller gradually decreases the braking effort only if the gradient sensor determines the slope of the descending slope to be at least approximately 20%.

14. A method of controlling a braking effort within a brake control system for a motor vehicle having a hill descent control mode with a preset vehicle speed, the vehicle having a gradient sensor, the brake control system having a driver operated brake command input, a brake actuator for actuating at least one of the plurality of brakes, and a brake controller for controlling the brake actuator in accordance with the operation of the brake command input and vehicle parameters, the method comprising:
   determining whether the hill descent control mode is activated;
   determining with the brake controller that the vehicle is held stationary on a slope by a braking effort;
   determining with the brake controller that the driver operated brake command input is released; and
   if the previous steps are confirmed, releasing the braking effort supplied by the brakes at a gradual rate by controlling the brake actuator as a function of the steepness of the slope as determined by the gradient sensor to allow the vehicle to accelerate until the preset vehicle speed is reached and automatically applying the brakes through the brake actuator as needed to allow the vehicle to maintain the preset vehicle speed, the gradual rate characterized by the braking effort being applied at least a first level and a second level, the first level partially restraining movement of a least a portion of the plurality of wheels such that the vehicle begins to descend the slope despite the braking effort, the second level being sufficiently greater than the first level such that the vehicle is held stationary on the slope.

15. A method as claimed in claim 14 further comprising controlling the brake actuator to retain the braking effort for a period of time which varies as a function of the steepness of the slope determined by the gradient sensor before releasing the braking effort.

16. A method as claimed in claim 14 further comprising monitoring an accelerator pedal position sensor with the brake controller during release of the braking effort, and immediately releasing the braking effort upon receiving a signal from the accelerator pedal position sensor.

17. The method of claim 14 further comprising controlling the brake actuator to provide the first level of braking effort such that the vehicle descends the slope more slowly than the vehicle would descend the slope in the absence of any braking force being applied to the plurality of wheels.

18. A method as recited in claim 14 wherein the gradual rate by which the brake effort is controlled from the first level to the second level is inversely proportional to the steepness of the slope, resulting in the gradual rate being slower when the steepness is higher and faster when the steepness is lower.

19. A method of controlling a braking effort within a brake control system for a motor vehicle having a hill descent control mode with a preset vehicle speed, the vehicle having a gradient sensor, the brake control system having a driver operated brake command input, a brake actuator for actuating at least one of the plurality of brakes, and a brake controller for controlling the brake actuator in accordance with the operation of the brake command input and vehicle parameters, the method comprising:
   determining whether the hill descent control mode is activated;
   determining with the brake controller that the vehicle is held stationary on a slope by a braking effort;
   determining with the brake controller that a signal from the gradient sensor indicates that the slope is steeper than a predetermined value;
   determining with the brake controller that the driver operated brake command input is released; and
   if the previous steps are confirmed, releasing the braking effort supplied by the brakes at a predetermined rate to allow the vehicle to accelerate until the preset vehicle speed is met and automatically applying the brakes through the brake actuator as needed to allow the vehicle to maintain the preset vehicle speed, wherein the predetermined rate results in some braking effort being supplied while the vehicle at least initially begins to move along the slope after being held stationary.

20. A method as claimed in claim 19 further comprising monitoring an accelerator pedal position sensor with the brake controller during release of the braking effort, and immediately releasing the braking effort upon receiving a signal from the accelerator pedal position sensor.

21. A method as recited in claim 19 wherein the predetermined value is 20%.

* * * * *

UNITED STATES PATENT AND TRADEMARK OFFICE
CERTIFICATE OF CORRECTION

| | | |
|---|---|---|
| PATENT NO. | : 7,762,633 B2 | Page 1 of 1 |
| APPLICATION NO. | : 11/551442 | |
| DATED | : July 27, 2010 | |
| INVENTOR(S) | : Andrew Maskell et al. | |

It is certified that error appears in the above-identified patent and that said Letters Patent is hereby corrected as shown below:

On the title page, item [73] Assignee, should read -- Land Rover --.

Signed and Sealed this
Twenty-sixth Day of July, 2011

David J. Kappos
*Director of the United States Patent and Trademark Office*